United States Patent [19]
Aarseth

[11] Patent Number: 5,979,506
[45] Date of Patent: Nov. 9, 1999

[54] ARRANGEMENT IN A PIPE BUNDLE

[75] Inventor: Finn Aarseth, Hvalstad, Norway

[73] Assignee: Aker Engineering As, Oslo, Norway

[21] Appl. No.: 08/698,090

[22] Filed: Aug. 15, 1996

[30]     Foreign Application Priority Data

Aug. 16, 1995  [NO]  Norway ................................... 95 3217

[51] Int. Cl.$^6$ .................................................. F16L 53/00
[52] U.S. Cl. .............................. 138/33; 138/38; 138/114; 138/115; 138/149
[58] Field of Search .................................. 138/149, 111, 138/33, 32, 38, 114, 115

[56]            References Cited

U.S. PATENT DOCUMENTS

| | | | |
|---|---|---|---|
| 2,773,513 | 12/1956 | Isenberg ................................... | 138/111 |
| 3,315,703 | 4/1967 | Matthews et al. . | |
| 3,400,737 | 9/1968 | Matthews et al. ....................... | 138/111 |
| 3,522,413 | 8/1970 | Chrow ....................................... | 138/33 |
| 3,526,086 | 9/1970 | Morgan .................................... | 138/111 |
| 3,727,029 | 4/1973 | Chrow ....................................... | 138/33 |
| 3,975,617 | 8/1976 | Othmer . | |
| 4,194,536 | 3/1980 | Stine et al. ................................ | 138/33 |
| 4,303,826 | 12/1981 | Ando ......................................... | 138/33 |
| 4,653,541 | 3/1987 | Oehlschlaeger et al. . | |
| 4,798,230 | 1/1989 | Hopperdietzel . | |
| 5,381,511 | 1/1995 | Bahar et al. . | |
| 5,390,961 | 2/1995 | Guthrie ..................................... | 138/33 |
| 5,692,545 | 12/1997 | Rodrigue ................................. | 138/115 |

FOREIGN PATENT DOCUMENTS

| | | |
|---|---|---|
| 0485220 | 5/1992 | European Pat. Off. . |
| 0521582 | 1/1993 | European Pat. Off. . |
| 164942 | 8/1990 | Norway . |
| 170695 | 8/1992 | Norway . |
| 174068 | 11/1993 | Norway . |
| 2084284 | 4/1982 | United Kingdom . |

*Primary Examiner*—James F. Hook
*Attorney, Agent, or Firm*—Hedman, Gibson & Costigan, P.C.

[57]            ABSTRACT

The present invention relates to an arrangement in a pipe bundle, more specifically to a method and a system for heating subsea or on-shore pipelines, especially pipelines for transportation of substantially oil, gas and water, said pipelines (8, 108, 208) being arranged in a substantially cylindrical outer carrier pipe (1, 101, 201), and for the purpose of providing an arrangement wherein the quantity of heating cable can be reduced, and wherein the manufacturing of such arrangement can be simplified, at the same time as the finished arrangement will provide appropriate heating of the pipelines and the contents thereof, it is according to the invention suggested an arrangement comprising:

a carrier pipe (1, 101) having an outer and/or inner thermal insulation (2, 102), one or more longitudinally extending energy carriers (3, 4, 5; 103, 104, 105) extending in the longitudinal direction of said carrier pipe (1, 101) for the dissipation/transfer of heat directly and/or indirectly to said pipelines (8, 108), respectively said pipe bundle or bundles, and thereby to the contents of said pipelines.

36 Claims, 4 Drawing Sheets

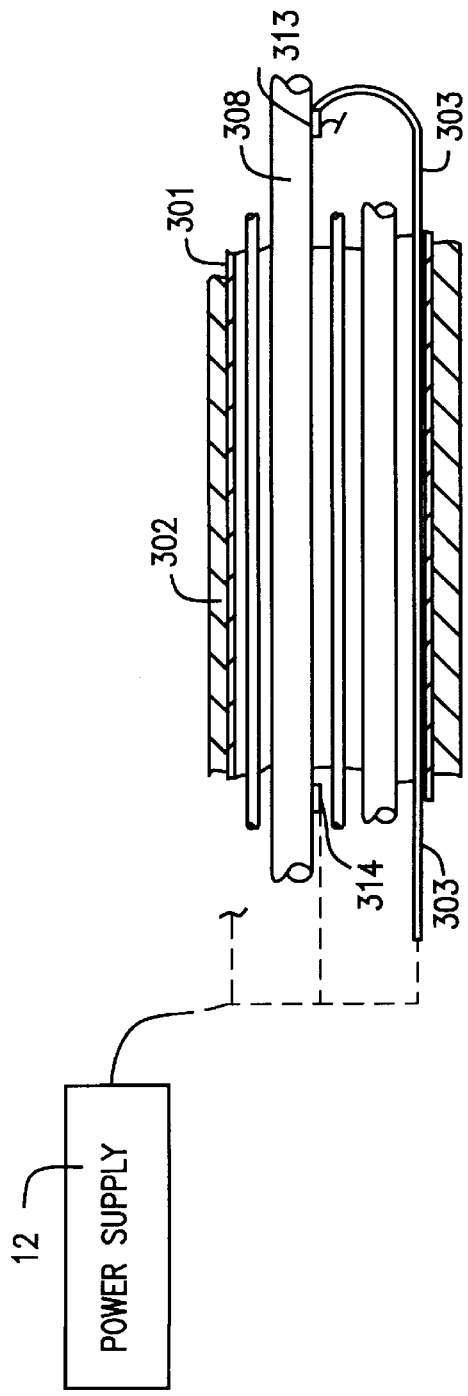
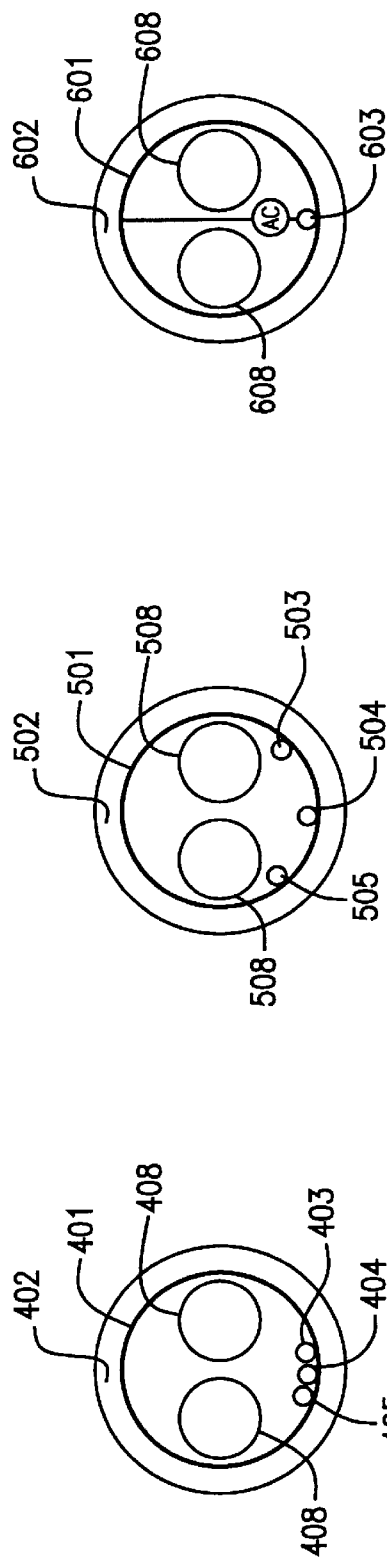

ARRANGEMENT IN A PIPE BUNDLE

FIELD OF THE INVENTION

The present invention relates to pipe bundles, and more specifically to a method for heating subsea or on-shore pipelines, and a pipeline system related thereto.

BACKGROUND OF THE INVENTION

Subsea transportation of oil, gas and water will generally be carried out by means of separate pipes for different media. In connection with multiphase production from a subsea well to a platform or land based installation, the flow from the well may comprise oil, gas and water in a mixture.

During subsea transportation the pipes and the contents thereof may be cooled to a subsea temperature of 3° C.

In connection with the transportation of unstabilized oil, this cooling may involve increased viscosity and/or deposits of wax on the cooled pipe surface that can lead to blocking of the flow.

Correspondingly, a super-cooled multiphase flow can during high pressure develop hydrate formations which may block the pipeline and cause time consuming and costly cleaning work.

Due to this reason temperature sensitive pipes will be insulated and are often supplied with chemicals which hampers the deposit and the formation of hydrates. An alternative is to employ electrical heating of thermally insulated pipes, such that the temperature is usually kept above 20° C.

The laying of separate process pipes for production as well as gas and water injection, etc., represents a substantial expenditure as regards the laying, burying and installation in the proximity of the platform.

A simplified method for such work is to collect the process pipes in a so-called pipe or pipeline bundle, wherein the pipelines are kept at a mutual spacing.

In order to, inter alia, strengthen the supporting properties of the structure, render protection to the process pipes, simplify the laying, etc., the pipe bundle is often mounted in a surrounding outer carrier pipe with appropriate properties.

In connection with temperature sensitive process pipes it is known that process pipes having preheated injection water, alternatively a dedicated pipe loop carrying preheated medium, can be used for heating such pipe bundles. The pipe bundle must then have an outer thermal insulation and be filled with liquid and/or gas for the distribution and transfer of heat.

Such heating is clearly limited as regards the transportation in long pipes of liquid require a sufficiently high temperature along the overall length of said pipes.

PRIOR ART

From EP 0 521 582 (Colemann-Kammula/Shell Int.) there is known an insulated flowline system comprising at least one flowline mounted within a carrier pipe, there being used spacers between said flowlines and carrier pipe for keeping the flowlines in place. In FIG. 3 of EP 0 521 582 there is illustrated at least one electric cable for electric heating of at least one flowline, as this is also expressed in patent claim 8 of said publication.

However, from the illustrated embodiment according to FIG. 3 there are suggested three electrical cables for heating one individual flowline, which flowline is surrounded by an insulation comprising three separate chambers containing particles and air in the pores between said particles, said chambers leaving a space therebetween for holding said electric cables, respectively.

According to EP 0 521 582 and specifically patent claim 9 thereof, it appears that any of the electric cables are arranged between a first and a second of said chambers being provided around a part of the circumference of the flowline itself and extending in the longitudinal direction of the flowline system. Consequently, it is here not a question of any heating of the carrier pipe, but a so to say direct heating of an individual flowline.

The prior art solution according to EP 0 521 582 can be compared as a variant of what appears from NO 170 695 (Grøsvik et al./Aker Engineering/Alcatel STK), corresponding to U.S. Pat. No. 5, 256, 844, in which publications there are suggested electrical cables for heating one single pipe, and wherein room is given for the electric cables in the insulation around said individual pipe.

Prior art technique wherein electrical conductors are used for inductive heating of an individual pipe by integrating electrical conductors in the pipe insulation around the circumference of the pipe is also known from NO 174 068 (Ahlen/Den norske stats oljeselskap) corresponding to WO 90/05266, which publication is hereby included as reference.

The present invention may be regarded as a further development of the techniques described in NO 170 695 and NO 174 068 as regards inductive and resistive utilisation of electric energy for heating purposes. However, the present invention paves the way for heating, not individual pipelines, but heating the complete bundle of pipelines, and then by utilising the outer and/or inner thermally insulated carrier pipe for the transfer and distribution of heat, as this is further specified in the appending patent claims.

U.S. Pat. No. 4,789,230 (Hopperdietzel) relates to a heatable plastic hose having a cross sectional centre point and a hose wall which defines, along the inner surface thereof, a longitudinal cavity having a cross sectional centre point which is laterally offset from the cross sectional centre point of the tubular hose. However, no suggestion for heating pipe bundles is to be found in this patent specification, let alone a carrier pipe encircling a plurality of individual pipelines.

U.S. Pat. No. 4,653,541 (Oehlschlaeger) relates to a dual wall safety tube assembly comprising a plurality of fluid pipes arranged in an outer carrier pipe, but neither here is there any token about heating an insulated carrier pipe, but rather a thermal heating cable which is twisted around the inner fluid pipes, which is completely different from the present invention.

U.S. Pat. No. 3,315,703 (Matthews et al.) relates to a composite tubing product comprising a central fluid transporting core around which are arranged a plurality of heat transporting pipe elements for heating the fluid carrying core, which system deviates from the field of application to which the present invention relates, namely heating of pipe bundles arranged in a carrier pipe.

Further publications related to heating of pipelines and hoses are GB 2 084 284-a (Hoshira), NO 164 942 (Bilstad/Den norske stats oljeselskap) and U.S. Pat. No. 5,381,511 (Baker et al.).

OBJECTS OF THE INVENTION

An object of the present invention is to devise a new field of application as regards inductive, capacitive and resistive utilisation of electrical energy for heating pipe bundles.

Another object of the present invention is to devise a combined heating of a pipe bundle and transmission of electric power to consumers along the carrier pipe or at the end of the carrier pipe or pipe bundle.

Still another object of the present invention is to provide a heating system wherein the number of cables are considerably reduced compared with electric heating individual lines.

Another object of the present invention is to provide a heating system wherein the installation of cables in connection with pipe bundles involves a simplification, since the production of such a system can be carried out on shore and be associated with only one pipe length.

SUMMARY OF THE INVENTION

The above objects are achieved in an arrangement in a pipe bundle according to the present invention, which is characterized by the features as stated in the appending patent claims.

In a method for heating subsea or on-shore pipelines, especially pipelines for transportation of substantially oil, gas and water, said pipelines being arranged in one or more bundles which preferably are arranged in a cylindrical outer carrier pipe, such method is in accordance with the present invention characterized by:

providing for said carrier pipe an outer and/or inner thermal insulation, providing in the longitudinal direction of said carrier pipe one or more longitudinally extending energy carriers for the supply of heat directly and/or indirectly to said pipelines, respectively said pipe bundle or bundles, and thereby to the contents of said pipelines.

In a system for heating subsea or on-shore pipelines, especially pipelines for transportation of substantially oil, gas and water, said pipelines being arranged in one or more bundles which preferably are arranged in a cylindrical outer carrier pipe, such a system is in accordance with the present invention characterized in that said carrier pipe comprising an outer and/or inner thermal insulation, said carrier pipe being provided in the longitudinal direction thereof with one or more longitudinally extending energy carriers for the transfer of heat directly and/or indirectly to said pipelines, respectively said pipe bundle or bundles, and thereby to the contents of said pipelines.

Further features and advantages of the present invention will appear from the following description of embodiments taken in conjunction with the appended drawings, as well as from the enclosed patent claims.

BRIEF DESCRIPTION OF THE DRAWINGS

FIG. 5 is a schematical longitudinal section through an embodiment of a pipe bundle in a carrier pipe, wherein the electric connection is utilising a pipe in the bundle as an electrical return conductor.

FIG. 6 is a cross section through a further embodiment of an arrangement in a pipe bundle, comprising two process pipes included in a carrier pipe which is carrying an outer thermal insulation, the heating cables here being arranged as a 50/60 Hz three phase system.

FIG. 7 is a cross section through still another embodiment of an arrangement in a pipe bundle according to the invention, the heating cables here being arranged as a three phase induction system of 200 Hz.

FIG. 8 is a cross section through yet another embodiment of an arrangement in a pipe bundle according to the present invention, wherein one heating cable carrying 50/60 Hz current is used for direct heating.

DETAILED DESCRIPTION OF EMBODIMENTS

Figure 1:
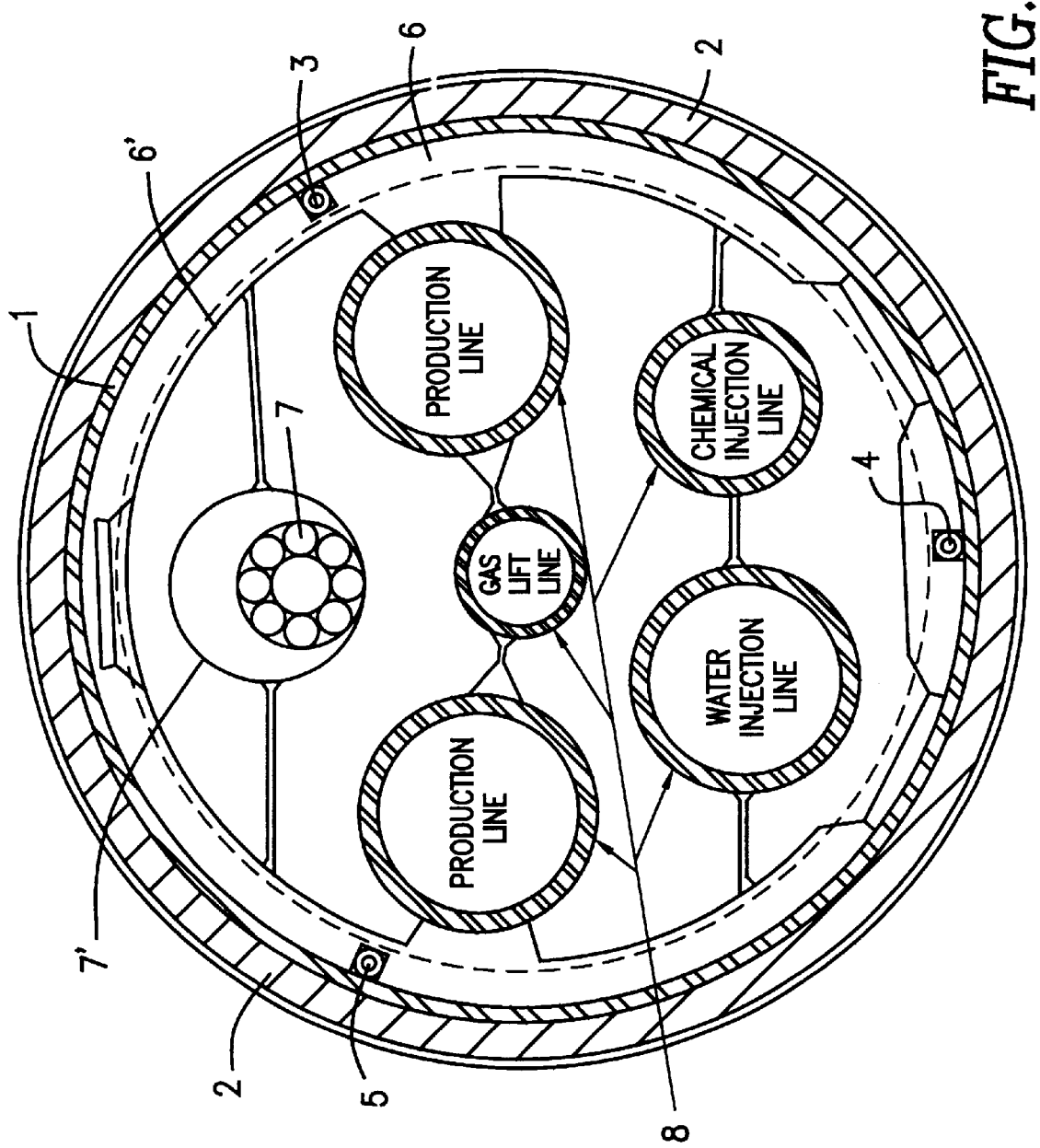
FIG. 1 is a schematical cross section of a pipe bundle in a carrier pipe, illustrating how electrical cables can be installed in a first embodiment, according to the invention, when the carrier pipe is provided with outer insulation.

In FIG. 1 which is a cross section through a first arrangement in a pipe bundle according to the present invention, there is illustrated an outer carrier pipe 1 being of substantially cylindrical shape, and being manufactured preferably from a ferromagnetic steel material.

The carrier pipe 1 has been provided with an outer thermal insulation 2, i.e. on the outer surface of said carrier pipe 1. Three electrical conductors 3, 4 and 5 are mounted appropriately on the inner wall of said carrier pipe 1 and inside of the insulation 2 thereof, said conductors 3, 4 and 5 extending substantially along the full length of said carrier pipe 1. The electrical conductors 3, 4 and 5 are kept in place in relation to the carrier pipe 1 by means of substantially ring-shaped spacer and guiding means 6, which spacer and guiding means 6 also keep a plurality of process pipes 8 as well as an umbilical 7 in place in relation to said outer insulated carrier pipe 1. Appropriately, said umbilical 7 may be contained in a conduit 7'. The dashed line 6' illustrates a nylon liner.

The process pipes 8 which are to be heated through the dissipation or transfer of electric energy from said electric conductors 3, 4 and 5, can be used for conducting water, gas and oil, etc. In a multiphase transportation of said components the mixture will most often be under high pressure and will easily develop hydrates and wax deposits at low temperatures.

The umbilical 7 may comprise low voltage power and data cables, as well as one or more pipes for hydraulic oil, and may be screened for inductive fields by being contained in said separate pipe or conduit 7'.

Alternatively, one or more of the process pipes 8 can be insulated so as to be excluded from thermal influence.

In the embodiment illustrated in FIG. 1 there is suggested an arrangement including three electrical conductors 3, 4 and 5, which appropriately may be included in a three phase alternating current system. However, it is to be understood that also other numbers of conductors may be used, for example two conductors in a one phase system, or alternatively DC current. In order to increase the capacity for heating the pipelines arranged in the carrier pipe, at least one supplementary electrical conductor can be contemplated, such supplementary conductors being appropriately distributed around the circumference of the carrier pipe. The electrical conductors 3, 4 and 5 can, of course, be used for low frequency and high frequency alternating current. Higher frequencies than 50 Hz must usually be used for an effective inductive generation of larger quantities of energy for said heating.

Further, it is to be understood that the carrier pipe 1 can be filled with any type of liquid which is used to distribute heat from the electrical cables and to the inner pipelines and the contents thereof.

Depending on the electrical system to be used in connection with the electrical conductors, the heating of the pipe bundles can be based on inductive or resistive heating or a combination of both. In the embodiment illustrated in FIG. 1, wherein the insulation 2 is arranged on the outer surface of the carrier pipe 1, it may be appropriate to let the electrical cables 3, 4 and 5 have direct contact with said carrier pipe 1.

Consequently, the heating may be achieved by ohmic losses in one or more parallel conductors as well as from inductive losses which are generated in the metallic material of the carrier pipe, when any alternating current is supplied to the conductors. The basis of calculating such generation of heat which is to be used for heating the pipe bundle, will follow the equations of Ohm and Maxwell as regards electrical and magnetic relations.

The power losses dissipated or transferred from the electrical conductors to the carrier pipe will be further distributed to the inner pipelines since the carrier pipe is filled with liquid when being used in subsea surroundings. In on-shore installations the carrier pipe may alternatively be filled with liquid and/or gas.

In the illustrated embodiment in FIG. 1, as well as in other embodiments to be discussed in the following, the pipelines are very well protected from outer mechanical damages, and there is achieved a substantially better heat dissipating effect since no power losses or generated electric energy dissipate to the surrounding media, but are utilised in full internally within the carrier pipe for heating purposes.

Figure 2:
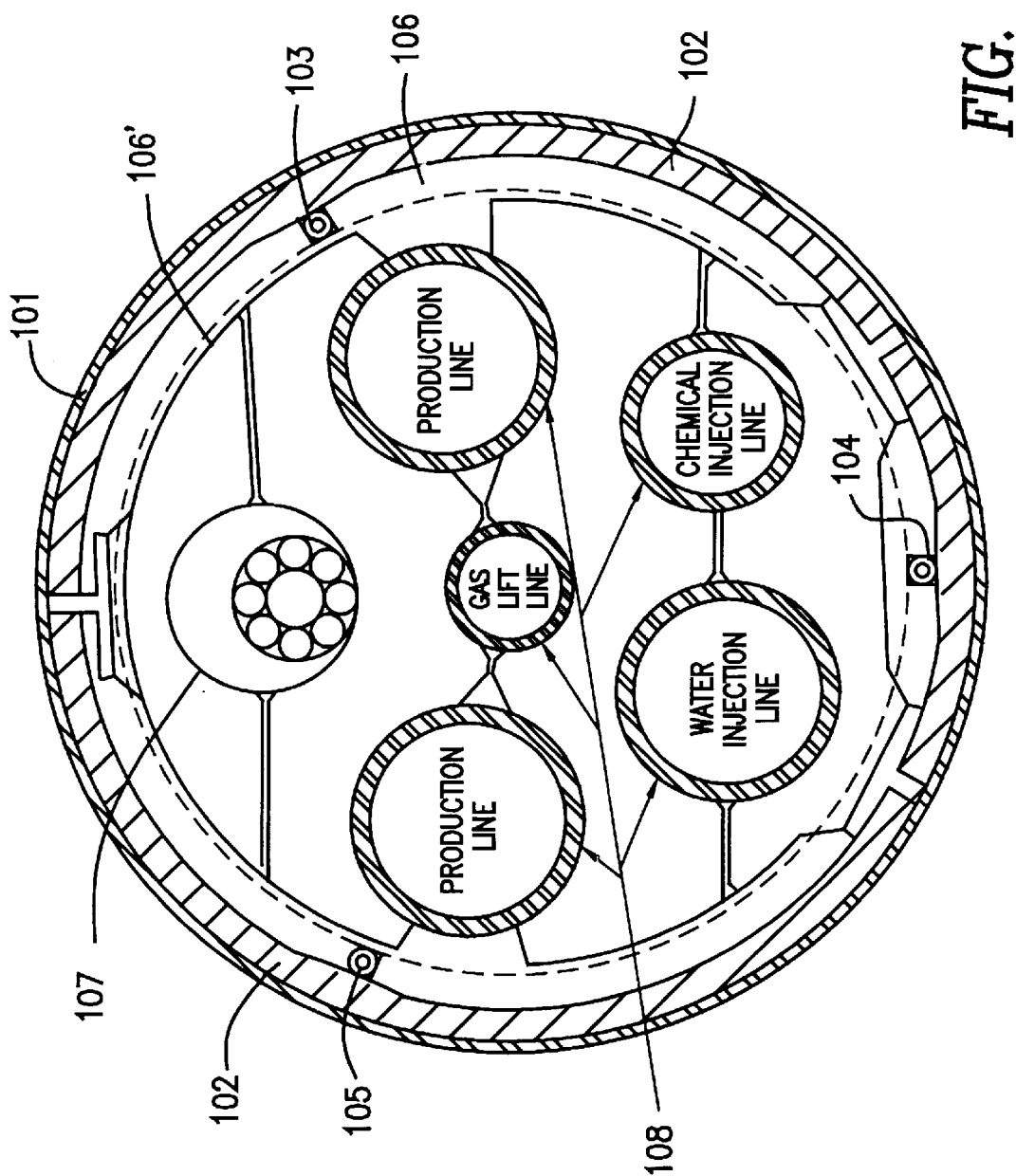
FIG. 2 is a schematical cross section of a pipe bundle illustrating how electrical cables can be installed in a second embodiment of the invention, the carrier pipe here being provided with inner insulation.

FIG. 2 is a cross section through a second embodiment of an arrangement according to the present invention, illustrating a carrier pipe 101 of an appropriate ferromagnetic steel material, but here supplied with a thermal insulation 102 on the inner surface thereof. Also here, three electrical conductors 103, 104 and 105 are arranged along the longitudinal extension of the carrier pipe 101, said electrical conductors 103, 104 and 105 being kept in place by a spacer and guiding means 106 which also keep inner process pipes 108 as well as an umbilical 107 in place in relation to the inner insulated carrier pipe 101. Also here, a dashed line 106' illustrates a nylon liner.

The electrical conductors 103, 104 and 105 can here be appropriately located in or on the surface of the thermal insulation 102, but will also here have the function of dissipating or transferring heat directly and/or indirectly to said pipelines 108, respectively the pipe bundle as herein defined, and thereby to the contents of said pipelines or pipe bundle.

Figure 3:
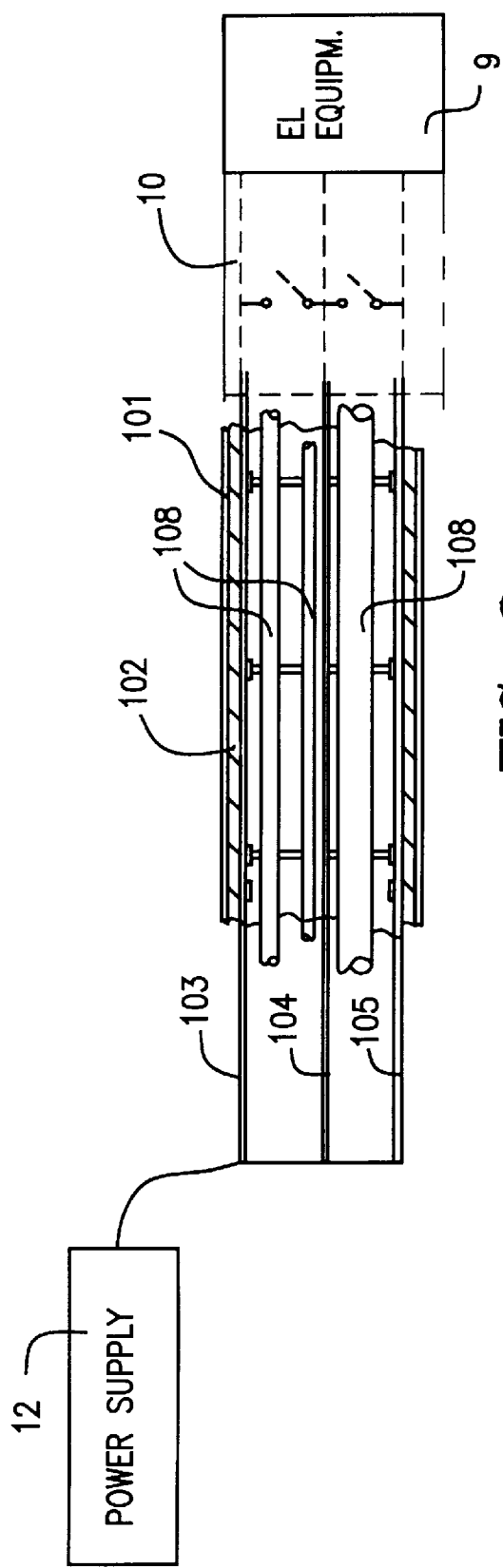
FIG. 3 is a schematical longitudinal section through a pipe bundle illustrating how electrical cables can be installed and connected and utilized for electrical heating and power supply according to the present invention.

In FIG. 3 there is illustrated a longitudinal section through an embodiment of an arrangement in a pipe bundle, similar to the embodiment as illustrated in FIG. 2, wherein is also illustrated a distribution box 10 as well as an electrical supply box 9 for the electrical connection of said electrical cables 103, 104 and 105. For offshore installation the distribution box 10 and the supply box 9 may be of water tight type, specifically for larger depths, and being specifically designed for insulated electrical connectors. When electrical equipment is not to be used, the conductors 103, 104 and 105 may, in connection with a multiphase system, be connected in a endstar connection for thereby providing a loop which possibly can be used only for heating of the pipelines 108 and the contents thereof.

In FIG. 3 there is also illustrated a power supply unit 12, the function thereof being for regulating simultaneous heating of said carrier pipe 101 and electric supply to the distribution box 10 and the associated electric equipment 9. The regulation may involve a frequency regulation from 0 Hz to 500 Hz. At 0 Hz the arrangement will operate as a direct current arrangement, involving marginal ohmic heating, but no induction heating at all.

The level of voltage may be chosen as appropriate, and the frequency may normally be varied from 0 to 500 Hz depending on the degree of induction losses being calculated, and the frequency utilised by the possibly connected equipment.

It should be understood that intermittent operation may be contemplate. A first mode of operation may then be inductive heating at an appropriate high frequency. When heating is not required the same electrical cables may be switched to a second operating mode for low frequency supply. The resistive heat due to transmission losses will then as a side effect contribute to the heating of the pipelines and the contents thereof.

Consequently, the electrical conductors may at the one end be connected to a power supply 12 and the other end be connected to a distribution means 10 for switching to different modes of operation.

Alternatively, one or two or more conductors may be connected to different power supplies and screened cables, which do no develop any inductive heat.

Figure 4:
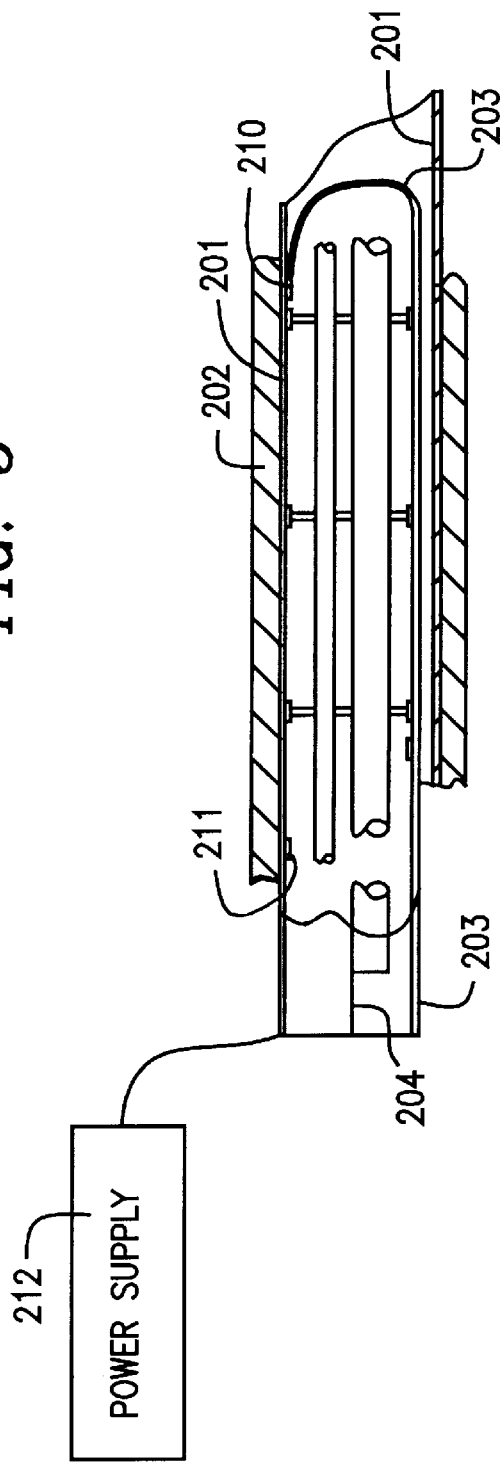
FIG. 4 a schematical longitudinal section illustrating a specific electric connection wherein the carrier pipe of the pipe bundle is used as return conductor.

In FIG. 4 there is illustrated an arrangement in a pipe bundle, comprising at least one electric cable 203 in a one or two phase heating system, wherein the metallic carrier pipe 201 is used as electric return conductor.

In FIG. 4 it is also illustrated how two phases of the power supply 212 may be connected to two conductors 203 and 204 for regular inductive heating, whereas the third phase is connected to the carrier pipe 201 through a connection 211 at the supply end and to a connection 210 at the opposite end.

FIG. 5 illustrates a corresponding electric connection as described in connection with FIG. 4, but here one of the process pipes 308 is used as return conductor by being provided with a front connection 314 as well as an end connection 313, whereas a regular electric conductor 303 completes the current path.

In practice the electric cables will as regards the dissipation or transfer of electric power or power losses for heating function, operate in a mixture of modes related to resistive and inductive effect. When the frequency is equal to zero, i.e. direct current, the heat generation will be based on purely resistive dissipation or transfer of energy, whereas at any frequency or any alternating current the inductive losses will also contribute to the intended heating of the pipe bundle or bundles in question.

FIG. 6–8 are a schematical cross sections illustrating variants of the functional principle underlying the present invention, i.e. the method and arrangement for heating pipe bundles by means of heating cables, induction cables and direct heating, or a combination thereof.

In the FIG. 6 embodiment there may appropriately be used two 10" process pipes 408 in a 28" carrier pipe 401 which is insulated with 60 mm thermal insulation 402 having a conductivity K=0,15 W/m° C. If internal temperature is calculated to 30° C. related to an outer ambient temperature of 5° C., this will require a heating effect of 150 W/m. There may be used three electrical cables 403, 404, 405 with a copper cross section of 240 mm², included in a 50/60 Hz three phase electrical system. A practical application for a 10 km bundle length will for example involve a power transmission of $P_{tot}$=1,7 MW, at a voltage of U=3,7 kW and a rated current $I_f$=850 A.

FIG. 7 is a cross section through another embodiment of a pipe bundle an arrangement according to the present invention, wherein is suggested a three phase induction system of for example 200 Hz. Transmission capacity will be $T_{tot}$=1,55 MW at a voltage level of U=8 kW with a nominal current of $I_f$=410 A.

FIG. 8 is a cross section of still another embodiment of an arrangement in a cable bundle according to the invention, wherein direct heating can take place with one electric conductor at a frequency of 50/60 Hz. Transmission capacity will be $P_{tot}$=1,58 MW, at a voltage of U=4,5 kV and a current of $I_f$=600 A.

Compared with previously known technology for heating production pipelines the present invention will represent a substantial advantage and progress of practical, economic and ecologic nature. Compared with the prior art according to NO 174 068 and NO 170 695, there is achieved a substantial saving in electric cable, because only one set of parallel cables is used for heating a plurality of pipelines. Further, the arrangement according to the present invention will involve a substantial simplification in the installation of electrical cables in the carrier pipe, since the manufacturing thereof may take place on shore and only be related to one single running length of carrier pipe.

It is also to be understood that although the use of capacitive currents has not been discussed in detail, such currents may be used in order to control the electrical parameters involved in the overall system, depending on the voltage, frequency and load to be used.

Further, it is to be understood that the definition of pipe bundle should cover any number of pipes, i.e. one or more pipes included in a carrier pipe.

What is claimed is:

1. Method for heating subsea or on-shore pipelines, especially pipelines for transportation of substantially oil, gas and water, said pipelines (8, 108, 208) being arranged in a substantially cylindrical outer carrier pipe (1, 101, 201), characterized in that for the heating of said pipelines (8, 108, 208):

providing for said carrier pipe (1, 101) an outer (2) and/or inner (102) thermal insulation (2; 102), providing in the longitudinal direction of and associated in close proximity with said carrier pipe (1, 101) one or more longitudinally extending energy carriers (3, 4, 5; 103, 104, 105) for the dissipation/transfer of heat indirectly to said pipelines (8, 108), respectively said pipe bundle or bundles, and thereby to the contents of said pipe bundles, said energy carriers not contacting the pipelines or the insulation thereon.

2. Method as claimed in claim 1, characterized in utilising a carrier pipe (8, 108) which is filled with a fluid, preferably liquid or gas, for the transfer of heat from the energy carrier (3, 4, 5; 103, 104, 105) to said pipelines (8, 108), respectively said pipe bundle in said pipe carrier (1, 101) and thereby to the contents of said transporting pipelines (8, 108).

3. Method as claimed in claim 2, characterized by using as energy carriers one or more electrical conductors (3, 4, 5; 103, 104, 105) which extend in the longitudinal direction of said carrier pipe (1, 101) in close proximity along the insulated (2, 102) wall of said carrier pipe (1, 101).

4. Method as claimed in claim 3, characterized by using energy carrying electric conductors (103, 104, 105) which are provided in or on an inner thermal insulation (102) of the carrier pipe (101).

5. Method as claimed in claim 3, characterized by using energy carrying electric conductors (3, 4, 5) which are arranged directly against the inner surface of a carrier pipe (1) which is provided with an outer thermal insulation (2).

6. Method as claimed in claim 3, characterized by using a heat insulated carrier pipe (1, 101) of current conducting material, and by using energy carrying conductors (3, 4, 5; 103, 104, 105) used for inductive and resistive heating.

7. Method as claimed in claim 6, characterized by using energy carrying electric conductors (103, 104, 105) which are provided in or on an inner thermal insulation (102) of the carrier pipe (101).

8. Method as claimed in claim 6, characterized by using energy carrying electric conductors (3, 4, 5) which are arranged directly against the inner surface of a carrier pipe (1) which is provided with an outer thermal insulation (2).

9. Method as claimed in claim 1, characterized by supplying the energy carriers (3, 4, 5; 103, 104, 105) with a current having a frequency from 0 to approx. 500 Hz or more, depending on the degree of resistive and/or inductive heating.

10. Method as claimed in claim 1, characterized by heating by said energy carriers (3, 4, 5; 103, 104, 105) in intermittent operation, said energy carriers in different mode of operation being used for different energy supplies, for example current supply, in which transmission losses will contribute to preceding heating mode.

11. Method as claimed in claim 1, characterized in using energy carriers, specifically electrical conductors (103, 104, 105) which at the one end are connected to a power supply (12), and which at the other end are connected to a switching means (10) for switching in and out various modes of operation (9).

12. Method as claimed in claim 1, characterized by using one or more individual pipelines and/or the carrier pipe as electrical return conductor and heat dissipating element.

13. Method as claimed in claim 1, characterized by using single phase or two phase power supply for connection to a corresponding number of heat carriers, especially a connection of screened cables having small inductive heat development.

14. Method as claimed in claim 1, characterized by using an on-shore manufactured assembly of pipelines, carrier pipe and energy carriers for heating of production pipelines (3, 4, 5; 103, 104, 105).

15. Method as claimed in claim 1, characterized by using as energy carriers one or more electrical conductors (3, 4, 5; 103, 104, 105) which extend in the longitudinal direction of said carrier pipe (1, 101) in close proximity along the insulated (2, 102) wall of said carrier pipe (1, 101).

16. Method as claimed in claim 15, characterized by using a heat insulated carrier pipe (1, 101) of current conducting material, and by using energy carrying conductors (3, 4, 5; 103, 104, 105) used for inductive and resistive heating.

17. Method as claimed in claim 15, characterized by using energy carrying electric conductors (103, 104, 105) which are provided in or on an inner thermal insulation (102) of the carrier pipe (101).

18. Method as claimed in claim 15, characterized by using energy carrying electric conductors (3, 4, 5) which are arranged directly against the inner surface of a carrier pipe (1) which is provided with an outer thermal insulation (2).

19. System for heating subsea or on-shore pipelines, especially pipelines for transportation of substantially oil, gas and water, said pipelines (8, 108, 208) being arranged in a substantially cylindrical outer carrier pipe (1, 101, 201), characterized in that the system comprises:

a carrier pipe (1, 101) having an outer and/or inner thermal insulation (2, 102), one or more longitudinally extending energy carriers (3, 4, 5; 103, 104, 105) extending in the longitudinal direction of and associated in close proximity with said carrier pipe (1, 101) for the dissipation/transfer of heat indirectly to said pipelines (8, 108), respectively said pipe bundle or bundles, and thereby to the contents of said pipelines, said energy carriers not contacting the pipelines or the insulation thereon.

20. System as claimed in claim 19, characterized by comprising a carrier pipe (8, 108) which is filled with a fluid, preferably liquid or gas, for the transfer of heat from the energy carrier (3, 4, 5; 103, 104, 105) to said pipelines (8, 108), respectively said pipe bundle in said pipe carrier (1, 101) and thereby to the contents of said transporting pipelines (8, 108).

21. System as claimed in claim 20, characterized by comprising as energy carriers, one, two or several electrical conductors (3, 4, 5; 103, 104, 105) which extend in the longitudinal direction of said carrier pipe (1, 101) in close proximity along the insulated (2, 102) wall of said carrier pipe (1, 101).

22. System as claimed in claim 21, characterized by comprising energy carrying electric conductors (103, 104, 105) which are provided in or on an inner thermal insulation (102) or the carrier pipe (101).

23. System as claimed in claim 21, characterized by comprising energy carrying electric conductors (103, 104, 105) which are arranged directly against the inner surface of a carrier pipe (1) which is provided with an outer thermal insulation (2).

24. System as claimed in claim 21, characterized by comprising a heat insulated carrier pipe (1, 101) of current conducting material, and by using energy carrying conductors (3, 4, 5; 103, 104, 105) used for inductive and resistive heating.

25. System as claimed in claim 24, characterized by comprising energy carrying electric conductors (103, 104, 105) which are provided in or on an inner thermal insulation (102) or the carrier pipe (101).

26. System as claimed in claim 24, characterized by comprising energy carrying electric conductors (103, 104, 105) which are arranged directly against the inner surface of a carrier pipe (1) which is provided with an outer thermal insulation (2).

27. System as claimed in claim 19, characterized by a power supply unit (12) supplying the energy carriers (3, 4, 5; 103, 104, 105) with a current having a frequency from 0 to approximately 500 Hz or more, depending on the degree of resistive and/or inductive heating.

28. System as claimed in claim 19, characterized by a regulating and switching means (9) for regulating the heating by said energy carriers (3, 4, 5; 103, 104, 105) in intermittent operation, said energy carriers in different mode of operation being used for different energy supplies, for example current supply, in which transmission losses will contribute to preceding heating mode.

29. System as claimed in claim 19, characterized in comprising energy carriers, specifically electrical conductors (3, 4, 5) which at the one end are connected to a power supply (12), and which at the other end are connected to a switching means (10) for switching in an out various modes of operation (9).

30. System as claimed in claim 19, characterized by comprising one or more individual pipelines and/or the carrier pipe as electrical return conductor and heat dissipating element.

31. System as claimed in claim 19, characterized by a single phase or two phase power supply for connection to a corresponding number of heat carriers, especially a connection of screen cables having small inductive heat development.

32. System as claimed in claim 19, characterized by comprising an on-shore manufactured assembly of pipelines, carrier pipe and energy carriers for heating of production pipelines (3, 4, 5; 103, 104, 105).

33. System as claimed in claim 19, characterized by comprising as energy carriers one, two or several electrical conductors (3, 4, 5; 103, 104, 105) which extend in the longitudinal direction of said carrier pipe (1, 101) in close proximity along the insulated (2, 102) wall of said carrier pipe (1, 101).

34. System as claimed in claim 33, characterized by comprising a heat insulated carrier pipe (1, 101) of current conducting material, and by using energy carrying conductors (3, 4, 5; 103, 104, 105) used for inductive and resistive heating.

35. System as claimed in claim 33, characterized by comprising energy carrying electric conductors (103, 104, 105) which are provided in or on an inner thermal insulation (102) or the carrier pipe (101).

36. System as claimed in claim 33, characterized by comprising energy carrying electric conductors (103, 104, 105) which are arranged directly against the inner surface of a carrier pipe (1) which is provided with an outer thermal insulation (2).

* * * * *